(12) United States Patent
Gordon

(10) Patent No.: US 7,953,161 B2
(45) Date of Patent: May 31, 2011

(54) SYSTEM AND METHOD FOR OVERLAP TRANSFORMING AND DEBLOCKING

(75) Inventor: Stephen Gordon, N. Andover, MA (US)

(73) Assignee: Broadcom Corporation, Irvine, CA (US)

( * ) Notice: Subject to any disclaimer, the term of this patent is extended or adjusted under 35 U.S.C. 154(b) by 1391 days.

(21) Appl. No.: 11/412,617

(22) Filed: Apr. 27, 2006

(65) Prior Publication Data

US 2006/0245503 A1    Nov. 2, 2006

Related U.S. Application Data

(60) Provisional application No. 60/675,377, filed on Apr. 27, 2005.

(51) Int. Cl.
*H04N 7/18* (2006.01)

(52) U.S. Cl. .......... 375/240.29; 375/240.25; 375/240.26
(58) Field of Classification Search . 375/240.01–240.29
See application file for complete search history.

(56) References Cited

U.S. PATENT DOCUMENTS

| 7,162,093 B2 * | 1/2007 | Regunathan et al. | 382/233 |
| 7,242,713 B2 * | 7/2007 | Srinivasan et al. | 375/240.01 |
| 7,369,709 B2 * | 5/2008 | Hsu et al. | 382/248 |

\* cited by examiner

*Primary Examiner* — Andy S Rao
(74) *Attorney, Agent, or Firm* — McAndrews, Held & Malloy, Ltd.

(57) ABSTRACT

Presented herein are inverse quantization and transform system(s) and method(s). In one embodiment, there is presented a method for deblocking. The method comprises reconstructing a macroblock, said macroblock comprising four blocks; and completing deblocking of a first one of the four blocks, with blocks from three neighboring blocks.

21 Claims, 5 Drawing Sheets

FIG. 4

|  |  |  |  |  |  |
|---|---|---|---|---|---|
| 120(i-1,j+1) (1) (3) | (2) (4) | 120(i,j+1) (1) (3) | (2) (4) | 120(i+1,j+1) (1) (3) | (2) (4) |
| 120(i-1,j) (1) (3) | (2) (4) | 120(i,j) (1) (3) | (2) (4) | 120(i+1,j) (1) (3) | (2) (4) |
| 120(i-1,j-1) (1) (3) | (2) (4) | 120(i,j-1) (1) (3) | (2) (4) | 120(i+1,j-1) (1) (3) | (2) (4) |

# SYSTEM AND METHOD FOR OVERLAP TRANSFORMING AND DEBLOCKING

RELATED APPLICATIONS

This application claims priority to "System and Method for Overlap Transforming and Deblocking", Provisional Application for U.S. Patent Ser. No. 60/675,377, filed Apr. 27, 2005 by Gordon, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

There are a variety of standards for encoding and compressing video data. Among the standards are MPEG-2, the ITU-H.264 Standard (H.264) (also known as MPEG-4, Part 10, and Advanced Video Coding), and VC-1.

A decoder that is capable of decoding video data encoded with numerous standards is also capable of decoding a greater amount of video content. However, the foregoing standards have a number of differences that complicate the decoding.

The MPEG-2, H.264, and VC-1 standards have a number of differences. For example, MPEG-2 uses 8×8 inverse transform and has no deblock filtering. H.264 uses 4×4 and 8×8 inverse transform and deblocks 4×4 edges. VC-1 uses 4×4, 4×8, 8×4, and 8×8 inverse transform and deblocks on 4×4 edges and overlap transform filters on 8×8 edges (for intra blocks only).

Additional limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, system(s), method(s) and/or apparatus for overlap transforming and deblocking, substantially as shown in and/or described in connection with at least one of the figures, as set forth more completely in the claims.

These and other advantages and novel features of the present invention, as well as illustrated embodiments thereof will be more fully understood from the following description and drawings.

BRIEF DESCRIPTION OF SEVERAL VIEWS OF THE DRAWINGS

FIG. 4 is a block diagram of exemplary macroblocks.

DETAILED DESCRIPTION OF THE INVENTION

According to certain aspects of the present invention, a deblocker overlap transforms and deblocks reconstructed pixel data.

Figure 1:
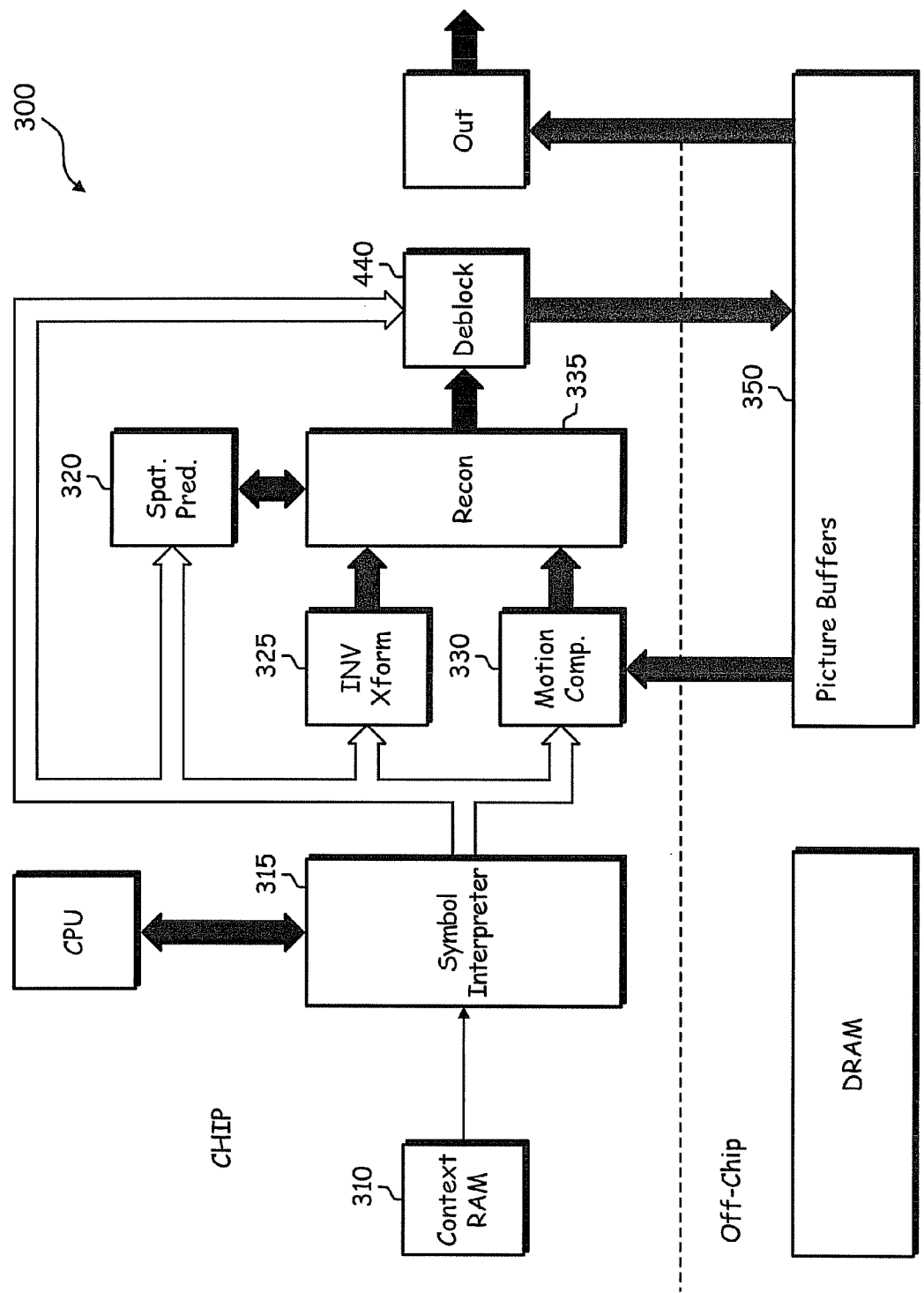
FIG. 1 is a block diagram of a video decoder in accordance with an embodiment of the present invention.

Referring now to FIG. 1, there is illustrated a block diagram describing an exemplary video decoder 300 in accordance with an embodiment of the present invention. The video decoder 300 includes a code buffer 305 for receiving a video elementary stream. The code buffer 305 can be a portion of a memory system, such as a dynamic random access memory (DRAM). A symbol interpreter 315 in conjunction with a context memory 310 decode entropy coded symbols, such as CAVLC and CABAC symbols, from the bitstream. The context memory 310 can be another portion of the same memory system as the code buffer 305, or a portion of another memory system.

The symbol interpreter 315 provides the sets of scanned quantized frequency coefficients to an inverse scanner, quantizer, and transformer (ISQT) 325. Depending on the prediction mode for the macroblock associated with the scanned quantized frequency coefficients, the symbol interpreter 315 provides the side information to either a spatial predictor 320 (if spatial prediction) or a motion compensator 330 (if temporal prediction).

The ISQT 325 constructs the prediction error E. The spatial predictor 320 generates the prediction pixels P for spatially predicted macroblocks while the motion compensator 330 generates the prediction pixels P, or P0, P1, for temporally predicted macroblocks. The motion compensator 330 retrieves the prediction pixels P, or P0, P1, from picture buffers 350 that store previously decoded frames or fields.

A pixel reconstructor 335 receives the prediction error E from the ISQT 325, and the prediction pixels from either the motion compensator 330 or spatial predictor 320. The pixel reconstructor 335 reconstructs the macroblock 120 from the foregoing information and provides the macroblock 120 to a deblocker 340.

The deblocker 340 overlap transforms and deblocks the pixels near the edges of the blocks to prevent the appearance of blocking. The deblocker 340 writes the decoded block to the picture buffer 350.

In certain embodiments of the present invention, the pixel reconstructor 335 and deblocker 340 can work together in a pipelined fashion. For example, the pixel reconstructor 335 can reconstruct a first macroblock. After the pixel reconstructor 335 reconstructs the first macroblock, the deblocker 440 can overlap transform and deblock a 16×16 block that straddles the first macroblock, its left, top, and top left neighbor, while the pixel reconstructor 335 reconstructs another macroblock.

Figure 2A:
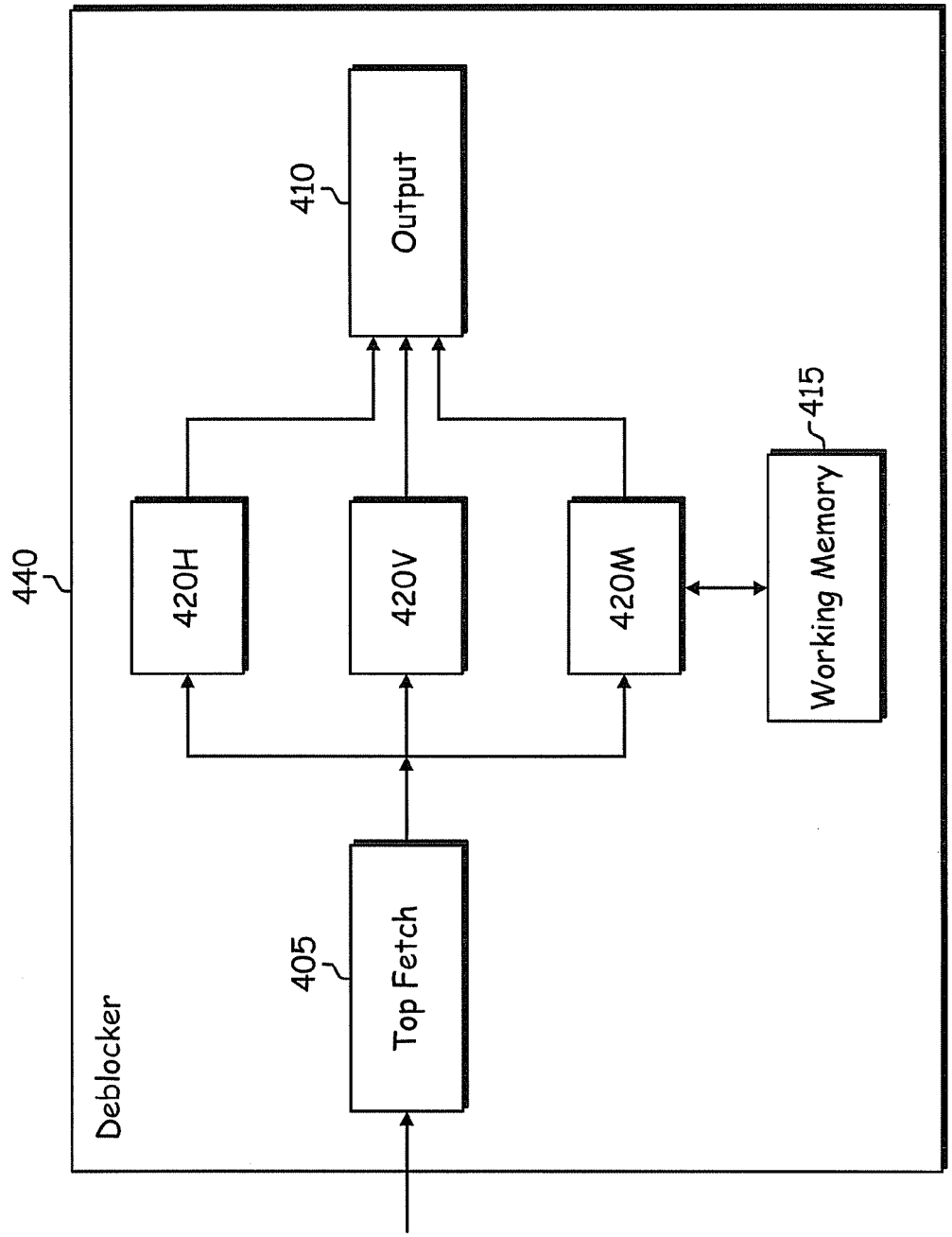
FIG. 2A is a block diagram of an exemplary deblocker in accordance with an embodiment of the present invention.

Referring now to FIG. 2A, there is illustrated a block diagram describing an exemplary deblocker 440 in accordance with an embodiment of the present invention. The deblocker 440 comprises a VC-1 filtering engine 420V, an H.264 filtering engine 420H, and an MPEG-2 filtering engine 420M, a top fetch buffer 405, an output buffer 410, and a working memory 415.

Figure 2B:
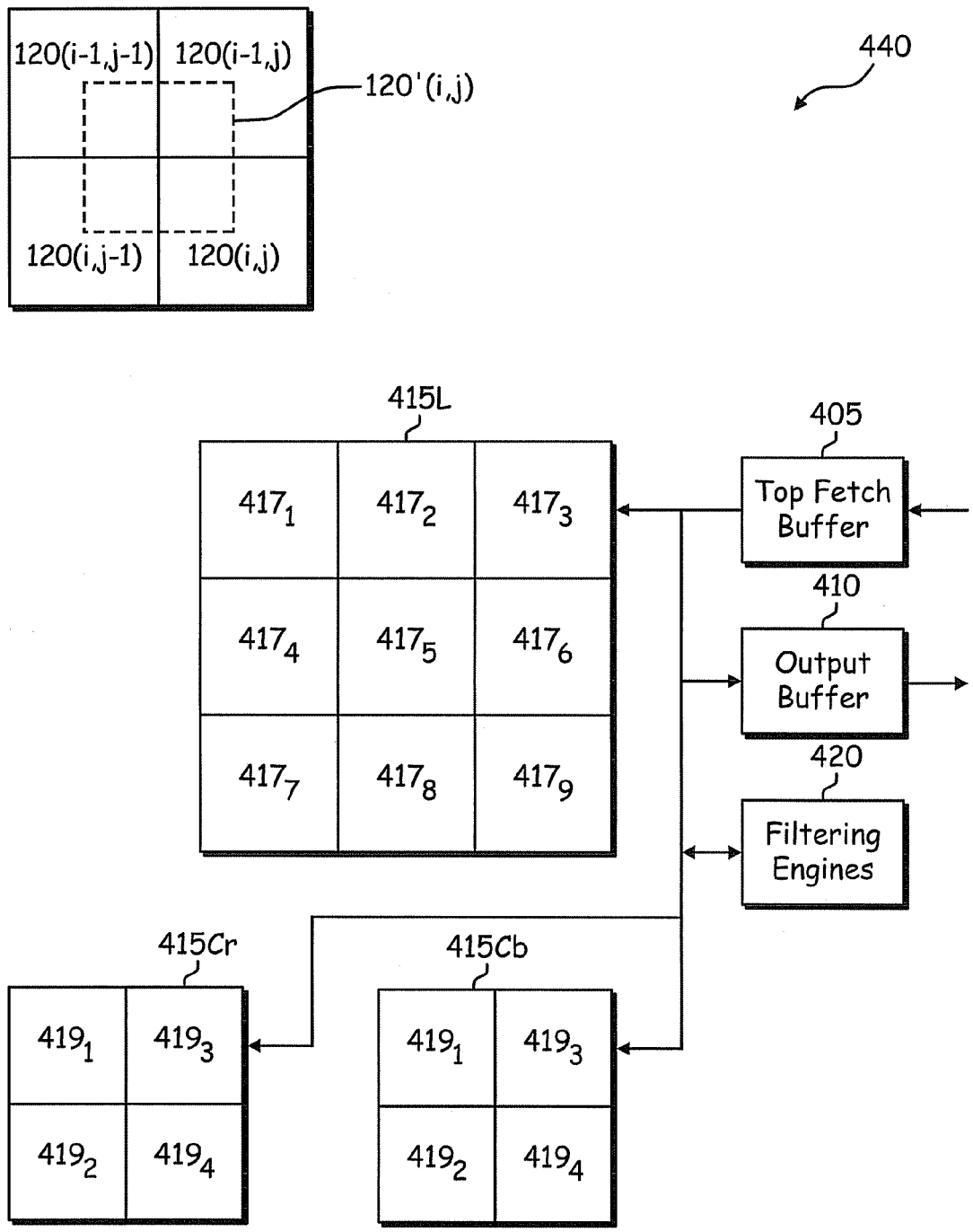
FIG. 2B is a block diagram describing the operation of a deblocker in accordance with an embodiment of the present invention.

The MPEG-2 filtering engine 420M writes the reconstructed pixels to the output buffer 410. The H.264 filtering engine 420H conditionally operates on 4×4 edges. The VC-1 filtering engine 420V comprises an overlap transform filter that conditionally operates on 8×8 edges of intra coded blocks, and a deblock filter that conditionally operates on 4×4 edges. In H.264 and VC-1, the modules also write the reconstructed pixels out to the output buffer Referring now to FIG. 2B there is illustrated a block diagram describing an exemplary deblocker 440 in accordance with an embodiment of the present invention. The deblocker 440 comprises a top fetch buffer 405, an output buffer 410, a luma working memory 415L, chroma red working memory 415Cr, chroma blue working memory 415Cb, and a filtering engine 420. In certain embodiments, the top fetch buffer 405, an output buffer 410, luma working memory 415L, chroma red working memory 415Cr, can comprise on-chip memory such as SRAM.

The luma working memory 415L has the capacity to store nine luma 8×8 blocks in memory $417_1 \ldots 417_9$. Four 8×8 luma blocks of reconstructed macroblock $120(i,j)$ can be stored in memory $417_5, 417_6, 417_8, 417_9$, the bottom two 8×8 blocks of a top neighboring macroblock $120(i-1, j)$ can be stored at memory $417_2, 417_3$, the right two 8×8 blocks of a left neighboring macroblock $120(i,j-1)$, can be stored at memory $417_4, 417_7$ and the bottom right 8×8 block of macroblock $120(i-1, j-1)$, can be stored at memory $417_1$.

As noted above, after the reconstructor 435 reconstructs a macroblock $120(i,j)$, the deblocker 440 completes the overlap transformation and deblocking of a 16×16 luma block $120'(i,j)$ that straddles macroblock $120(i,j)$, its left $120(i,j-1)$, top $120(i-1, j)$, and top left neighbor $120(i-1,j-1)$.

The working memory 415L receives the blocks stored in memory $417_5, 417_6, 417_8, 417_9$, from the reconstructor 435. The blocks stored in memory $417_2, 417_3$ are received from the top fetch buffer 405. While the deblocker 440 overlap transformed and deblocked block $120'(i,j-1)$, the deblocker 440 fetched the blocks of top neighboring macroblock $120(i-1, j)$ that are stored at memory $417_2, 417_3$. While the deblocker 440 overlap transforms and deblocks block $120'(i,j)$, the deblocker 440 fetches the blocks $417_2, 417_3$ for deblocking $120'(i,j+1)$.

The blocks stored in memory $417_1, 417_4, 417_7$ are available in the working memory 415L after deblocking and overlap transforming block $120'(i,j-1)$. After deblocking and overlap transforming block $120'(i,j)$, the blocks stored in memory $417_3, 417_6, 417_9$ are the blocks stored in memory $417_1, 417_4, 417_7$ for the next macroblock $120(i,j+1)$ to be received from the reconstructor 435.

In certain embodiments of the present invention, pointers can designate the portions that are $417_1, 417_4, 417_7$, and $417_3, 417_6, 417_9$. After overlap transforming and deblocking block $120'(i,j)$, the pointers can swap for the next macroblock. For the remainder of this discussion, the numeral reference $417_1$, shall refer to the portion of working memory 415L that stores a block from the top left neighbor $120(i-1, j-1)$, $417_4$ and $417_7$ shall refer to the portions of working memory 415L that stores blocks from the left neighbor $120(i, j-1)$, $417_3$ shall refer to the portion of working memory 415L that stores a block from the top neighbor $120(i-1, j)$, and $417_6$ and $417_9$ shall refer to the portions of working memory 415L that store blocks from the macroblock $120(i,j)$.

The filtering engine 420 completes the overlap transformation and deblocking for the 16×16 luma block that comprises the blocks that are stored in $417_1, 417_2, 417_4$, and $417_5$. After the filtering engine 420 completes the overlap transformation and dedeblocking of the blocks stored in $417_1, 417_2, 417_4$, and $417_5$, the foregoing blocks are written to the output buffer 410. The contents of the output buffer 410 are written to DRAM.

According to certain aspects of the present invention, the filtering engine 420 can overlap transform and deblock in multiple passes at different times. Thus, the blocks stored at $417_3, 417_6, 417_7, 417_8$, and $417_9$ can be partially overlap transformed and deblocked. The remainder can be performed with other macroblocks.

The chroma red/blue working memory 415Cr/415Cb (415C) have the capacity $419_1, 419_2, 419_3$, and $419_4$, to store chroma red/blue blocks from the top left $120(i-1,j-1)$, left $120(i,j-1)$, and top $120(i-1,j)$ neighbors, respectively, of newly reconstructed chroma red/blue blocks from macroblock $120(i,j)$. The top fetch buffer 405 fetches the chroma red/blue blocks from the top neighboring macroblock $120(i-1,j)$, while the chroma red/blue blocks from the new reconstructed macroblock $120(i,j)$ are received by the reconstructor. The foregoing blocks are the left and top left neighbors for the next macroblock $120(i,j+1)$ that is reconstructed. Thus, the top fetch buffer 405 can fetch only the chroma red/blue blocks of the top neighboring macroblock.

After receiving the chroma red/blue block of macroblock $120(i,j)$, the filter engine 420 completes the overlap transformation and deblocking of the chroma red/blue block of top left neighboring macroblock $120(i-1,j-1)$ in memory $419_1$.

According to certain aspects of the present invention, the filtering engine 420 can overlap transform and deblock in multiple passes at different times. Thus, the chroma red/blue blocks stored at memory $419_2, 419_3$, and $419_4$, can be partially overlap transformed and deblocked. The remainder can be performed with chroma red/blue blocks from other macroblocks.

In certain embodiments of the present invention, pointers can designate the portions that are $419_1, 419_3$, and the portions that are $419_2$, and $419_4$. After overlap transforming and deblocking the block in memory $419_1$, the pointers can swap for the next macroblock. For the remainder of this discussion, the numeral reference $419_1$, shall refer to the portions of working memory 415C that stores chroma red/blue blocks from the top left neighbor $120(i-1,j-1)$, $419_2$ shall refer to the portions of working memory 415C that store chroma red/blue blocks from the left neighbor $120(i, j-1)$, $419_3$ shall refer to the portions of working memory 415C that store chroma red/blue blocks from the top neighbor $120(i-1, j)$, and $419_4$ shall refer to the portions of working memory 415C that store the chroma red/blue blocks from the macroblock $120(i,j)$.

It is noted that the block dimensions described are exemplary and certain embodiments of the present invention can use different dimensions. Additionally, the different filtering engine 420 may use different dimension blocks.

Figure 3:
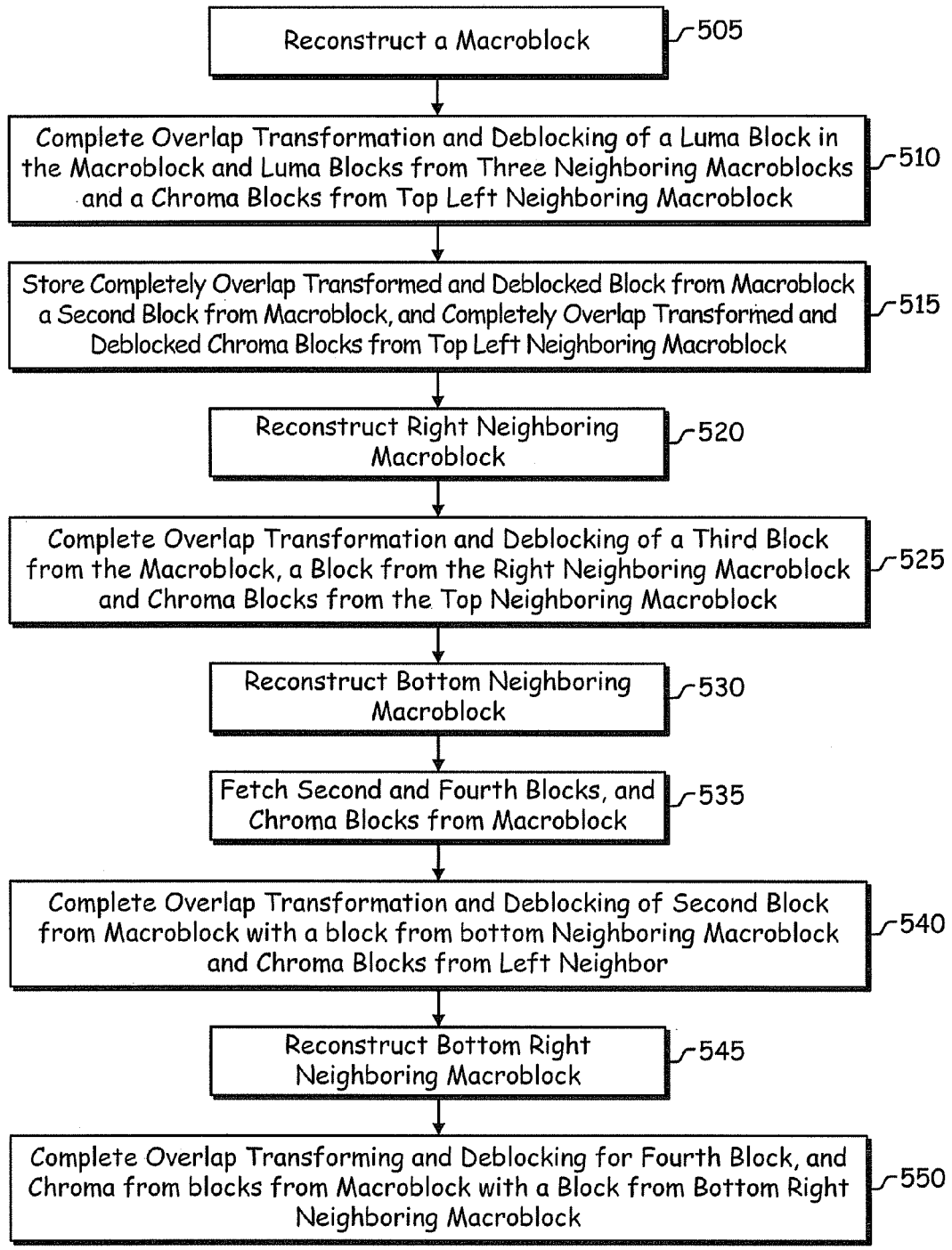
FIG. 3 is a flow diagram for overlap transforming and deblocking macroblocks in accordance with an embodiment of the present invention.

Referring now to FIG. 3, there is illustrated a flow diagram for overlap transforming and deblocking macroblocks in accordance with an embodiment of the present invention. The flow diagram of FIG. 3 will be described with references to FIG. 4. At 505, the pixel reconstructor 535 reconstructs a macroblock, $120(i,j)$ that comprises four luma blocks $120(i,j)$ (1) ... $120(i,j)$ (4), and chroma red/blue blocks $120C(i,j)$.

At 510, the deblocker 540 completes transforming and deblocking one of the luma blocks $120(i,j)$ (1) with luma blocks $120(i-1,j-1)$ (4), $120(i-1,j)$ (2), $120(i,j-1)$ (3) from three neighboring blocks $120(i-1,j-1)$, $120(i-1,j)$ and $120(i, j-1)$, as well as the chroma red/blue block from left neighboring macroblock $120(i-1, j-1)$. In certain embodiments of the present invention, blocks $120(i-1,j)$ (4), $120(i,j-1)$ (4), $120(i,j)$ (2), $120(i,j)$ (3), and $120(i,j)$ (4), can be partially overlap transformed and deblocked. As well, in certain embodiments of the present invention, chroma red/blue blue blocks $120C(i-1,j), 120C(i,j-1)$ from the top, and left neighboring macroblocks and the chroma red/blue block $120C(i,j)$ from the newly reconstructed macroblock, can be partially overlap transformed and deblocked.

At 515, the completely deblocked and overlap transformed block 120(i,j) (1), block 120(i,j) (2), and chroma red/blue blocks 120C(i−1,j−1) are stored. In certain embodiments of the present invention, blocks 120(i,j−1) (4), completely deblocked blocks 120(i−1,j−1) (4), 120(i−1,j) (2), 120(i,j−1) (3) can also be stored.

At 520, the right neighboring macroblock 120(i,j+1) is reconstructed. The luma blocks of the right neighboring macroblock 120(i,j+1) overwrite the completely overlap transformed and deblocked blocks 120(i,j) (1), 120(i,j) (2), and blocks 120(i,j−1) (3), 120(i,j−1) (4), while the chroma red/blue blocks 120C(i,j+1) overwrite the completely overlap transformed and deblocked blocks 120C(i−1,j−1).

At 525, the deblocker completes overlap transforming and deblocking of block 120(i,j) (3) and block 120(i,j+1) (1) in the right neighboring macroblock 120(i,j+1), as well as chroma block 120C(i−1,j). In certain embodiments of the present invention, the deblocker can also complete overlap transforming and deblocking of blocks 120(i−1,j+1) (2), 120(i−1, j) (4).

At 530, the bottom neighboring macroblock 120(i+1,j) is reconstructed. At 535, the second and fourth blocks 120(i,j) (2), 120(i,j) (4) from the macroblock 120(i,j), and chroma red/blue blocks 120C(i,j) are fetched. At 540, the overlap transformation and deblocking of the second block 120(i,j) (2) from the macroblock 120(i,j) with a block 120(i+1,j) (1) from the bottom neighboring macroblock 120(i+1,j), and chroma red/blue blocks 120C(i,j−1) are completed. In certain embodiments of the present invention, the overlap transforming and deblocking for a block 120(i,j−1) (4) from macroblock 120(i,j−1), a block 120(i+1,j−1) (3) from macroblock 120(i+1, j−1) is also completed.

At 545, a bottom right neighboring macroblock 120(i+1, j+1) is reconstructed. At 550, the overlap transformation and deblocking for a fourth block 120(i,j)(4) with a block 120(i+1,j+1) (1), and chroma red/blue blocks 120(i,j) are completed. In certain embodiments of the present invention, the overlap transformation and deblocking for block 120(i,j+1) (2) from macroblock 120(i, j+1), a block 120(i+1,j) (3) from macroblock 120(i+1,j) is also completed.

The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the functions can be implemented as hardware accelerator units controlled by the processor. For example, the symbol interpreter 415, the ISQT 425, spatial predictor 420, motion compensatory 430, pixel reconstructor 435, and display engine 445 can be hardware accelerators under the control of a central processing unit (CPU). The CPU can perform a number of functions, including the management of off-chip DRAM that is allocated to the video decoder 400.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on VC-1 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for deblocking, said method comprising:
reconstructing a macroblock, said macroblock comprising four blocks;
completing deblocking of a first one of the four blocks, with blocks from three neighboring blocks;
writing the completely deblocked block and a second one of the four blocks to a memory;
reconstructing a right neighboring macroblock comprising four blocks;
overwriting the completely deblocked block and the second one of the four blocks with a first block and a second block from the reconstructed right neighboring macroblock; and
complete deblocking of a third one of the blocks in the macroblock with one of the blocks in the right neighboring macroblock.

2. The method of claim 1, further comprising:
writing the completely deblocked block and a second one of the four blocks to a memory.

3. The method of claim 2, further comprising:
reconstructing a right neighboring macroblock comprising four blocks;
overwriting the completely deblocked block and the second one of the four blocks; and
complete deblocking of a third one of the blocks in the macroblock with one of the blocks in the right neighboring macroblock.

4. The method of claim 1, further comprising:
reconstructing a bottom neighboring macroblock; and
fetching the second one of the blocks from the macroblock and a fourth one of the blocks from the macroblock; and
completing deblocking of the second one of the blocks from the macroblock with one of block from the bottom neighboring macroblock.

5. The method of claim 4, further comprising:
reconstructing a bottom right neighboring macroblock;
completing deblocking of a fourth block of the macroblock after reconstructing the bottom right neighboring macroblock.

6. The method of claim 1, wherein the macroblock comprises a block of chroma pixels, said method further comprising:
completing deblocking of a block of chroma pixels from a top left neighboring macroblock.

7. A method for overlap transforming, said method comprising:
reconstructing a macroblock, said macroblock comprising four blocks; and
completing overlap transformation of a first block of the four blocks, with blocks from three neighboring blocks, after reconstructing the macroblock.

8. The method of claim 7, further comprising:
writing the completely overlap transformed first block and a second one of the four blocks of the macroblock to a non-volatile memory.

9. The method of claim 8, further comprising:
reconstructing a right neighboring macroblock comprising four blocks;
overwriting the completely overlap transformed block and the second one of the four blocks with at least a portion of the right neighboring macroblock; and
completing overlap transformation of a third block of the four blocks in the macroblock with one of the blocks in the right neighboring macroblock.

10. The method of claim 9, further comprising:
reconstructing a bottom neighboring macroblock;
fetching the second block of the four blocks from the macroblock and a fourth block of the four blocks from the macroblock; and
completing overlap transformation of the second block of the four blocks from the macroblock with a block from the bottom neighboring macroblock.

11. The method of claim 10, further comprising:
reconstructing a bottom right neighboring macroblock; and
completing overlap transformation of a fourth block of the four blocks of the macroblock after reconstructing the bottom right neighboring macroblock.

12. The method of claim 7, wherein the macroblock comprises a block of chroma pixels, said method further comprising:
completing overlap transformation of a block of chroma pixels from a top left neighboring macroblock.

13. A system for deblocking, said system comprising:
a pixel reconstructor for reconstructing a macroblock, said macroblock comprising four blocks; and
a deblocker for completing deblocking of a first block of the four blocks of the macroblock, with blocks from three neighboring macroblocks.

14. The system of claim 13, further comprising:
a non-volatile memory for storing the completely deblocked first block and a second block of the four blocks of the macroblock.

15. The system of claim 14, wherein the pixel reconstructor reconstructs a right neighboring macroblock, and wherein the deblocker deblocks a third block of the four blocks of the macroblock with a block of the right neighboring macroblock, said system further comprising:
a working memory for storing the right neighboring macroblock, thereby overwriting the completely deblocked block and the second block of the four blocks from the macroblock.

16. The system of claim 15, wherein the pixel reconstructor reconstructs a bottom neighboring macroblock; and wherein the system further comprises:
a direct memory access engine for fetching the second block of the four blocks from the macroblock and a fourth block of the four blocks from the macroblock from the non-volatile memory and writing the second and fourth blocks of the four blocks from the macroblock to the working memory; and
wherein the deblocker completes deblocking of the second block of the four blocks from the macroblock with a block from the bottom neighboring macroblock.

17. The system of claim 16, wherein the pixel reconstructor reconstructs a bottom right neighboring macroblock and wherein the deblocker completes deblocking of a fourth one of the four blocks of the macroblock after reconstructing the bottom right neighboring macroblock.

18. The system of claim 13, wherein the macroblock comprises a block of chroma pixels, and wherein the deblocker completes deblocking of a block of chroma pixels from a top left neighboring macroblock.

19. The method of claim 7, wherein said macroblock is interpredicted.

20. A method for deblocking, said method comprising:
storing a macroblock comprising a top left block, a top right block, bottom left block and a bottom right macroblock in a memory;
storing a top right block and bottom right block of a left neighboring macroblock in the memory;
storing a bottom left, and bottom right of a top neighboring macroblock in a memory;
storing a bottom right neighboring macroblock of a top left neighboring macroblock in the memory;
filtering each border between each of the block stored in the memory;
reconstructing a right neighboring macroblock;
overwriting the top right and bottom right blocks of the left neighboring macroblock and the top left and bottom left blocks of the macroblock with the right neighboring macroblock; and
filtering each border between each of the block stored in the memory after overwriting.

21. The method of claim 20, wherein filtering each border between each block stored in the memory after overwriting further comprises:
filtering the borders between the top right and bottom right blocks of the macroblock and the top left and bottom left blocks of the right neighboring macroblock.

* * * * *